United States Patent
Morrow et al.

(10) Patent No.: US 7,366,368 B2
(45) Date of Patent: Apr. 29, 2008

(54) OPTICAL ADD/DROP INTERCONNECT BUS FOR MULTIPROCESSOR ARCHITECTURE

(75) Inventors: Warren R. Morrow, Steilacoom, WA (US); Brandon C. Barnett, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 10/868,571

(22) Filed: Jun. 15, 2004

(65) Prior Publication Data

US 2005/0276604 A1 Dec. 15, 2005

(51) Int. Cl.
*H04B 10/20* (2006.01)
*H04J 14/00* (2006.01)
*G02F 1/01* (2006.01)
*G02F 1/035* (2006.01)
*G02F 1/295* (2006.01)
*G02F 1/03* (2006.01)
*G02F 1/07* (2006.01)
*G02F 1/29* (2006.01)
*G02B 6/12* (2006.01)
*G02B 6/26* (2006.01)
*G02B 6/42* (2006.01)

(52) U.S. Cl. ............ 385/15; 385/1; 385/2; 385/4; 385/8; 385/14; 385/31; 398/60; 398/73; 359/245; 359/315

(58) Field of Classification Search ............ 385/15, 385/31, 1, 2, 4, 8, 14; 398/73, 60; 359/245, 359/315
See application file for complete search history.

(56) References Cited

U.S. PATENT DOCUMENTS

| | | | |
|---|---|---|---|
| 4,504,921 A | 3/1985 | Nasuta et al. | |
| 4,775,971 A | 10/1988 | Bergmann | |
| 4,844,571 A | 7/1989 | Stanley | |
| 4,866,698 A | 9/1989 | Huggins et al. | |
| 4,932,737 A | 6/1990 | Yoon et al. | |
| 5,010,346 A | 4/1991 | Hamilton et al. | |
| 5,287,212 A | 2/1994 | Cox et al. | |
| 5,347,601 A | 9/1994 | Ade et al. | |
| 5,408,492 A | 4/1995 | Vossler et al. | |
| 5,504,607 A * | 4/1996 | Smith et al. | 398/79 |
| 6,052,495 A | 4/2000 | Little et al. | |

(Continued)

OTHER PUBLICATIONS

"TechEncyclopedia: SMP," TechWeb: The Business Technology Network. Retrieved Apr. 8, 2004, from http://www.techweb.com/encyclopedia/defineterm?term=smp.

(Continued)

*Primary Examiner*—Frank G. Font
*Assistant Examiner*—Jerry Martin Blevins
(74) *Attorney, Agent, or Firm*—Blakely, Sokoloff, Taylor & Zafman LLP

(57) ABSTRACT

An optical bus interconnects two or more processors in a multiprocessor system. One or more electrical-to-optical ("E-O") transmitters are optically coupled to the optical bus using optical couplers. The E-O transmitters receive electrical signals from the processors and convert the electrical signals to optical signals to be guided onto the optical bus. Optical-to-electrical ("O-E") receivers are also coupled to the optical bus using the optical couplers. The O-E receivers receive optical signals from the optical bus and convert the optical signals to electrical signals for the processors.

13 Claims, 6 Drawing Sheets

U.S. PATENT DOCUMENTS

| | | | |
|---|---|---|---|
| 6,192,167 B1 | 2/2001 | Kissa et al. | |
| 6,222,951 B1 | 4/2001 | Huang | |
| 6,339,663 B1 | 1/2002 | Leng et al. | |
| 6,343,171 B1 | 1/2002 | Yoshimura et al. | |
| 6,411,752 B1 | 6/2002 | Little et al. | |
| 6,421,483 B1 | 7/2002 | Hajjar | |
| 6,661,825 B2 | 12/2003 | Evans et al. | |
| 6,888,974 B2 | 5/2005 | Block et al. | |
| 2002/0019174 A1* | 2/2002 | Crane et al. | 439/676 |
| 2002/0048289 A1 | 4/2002 | Atanackovic et al. | |
| 2002/0071623 A1 | 6/2002 | Shekel et al. | |
| 2002/0178319 A1* | 11/2002 | Sanchez-Olea | 710/305 |
| 2003/0016418 A1* | 1/2003 | Westbrook et al. | 359/145 |
| 2003/0031399 A1 | 2/2003 | Lim et al. | |
| 2003/0128922 A1 | 7/2003 | Kolodziejski et al. | |
| 2004/0067006 A1 | 4/2004 | Welch et al. | |
| 2004/0184701 A1 | 9/2004 | Barnett et al. | |
| 2005/0013613 A1* | 1/2005 | Stevenson et al. | 398/60 |

OTHER PUBLICATIONS

"TechEncyclopedia: MPP," Tech Web: The Business Technology Network. Retrieved Apr. 8, 2004, from http://www.techweb.com/encyclopedia/defineterm?term=mpp.

"TechEncyclopedia: NUMA," Tech Web: The Business Technology Network. Retrieved Apr. 8, 2004, from http://www.techweb.com/encyclopedia/defineterm?term=numa.

"TechEncyclopedia: cache coherency," TechWeb: The Business Technology Network. Retrieved Apr. 8, 2004, from http://www.techweb.com/encyclopedia/defineterm?term=CACHECOHERENCY&exact=1.

Kobrinsky, M.J., et al., "On-Chip Optical Interconnects," Intel Technology Journal, vol. 8, Issue 2, May 10, 2004, pp. 129-142.

Mohammed, E., et al., "Optical Interconnect System Integration for Ultra-Short-reach Applications," Intel Technology Journal, vol. 8, Issue 2, May 10, 2004, pp. 115-128.

* cited by examiner

OPTICAL ADD/DROP INTERCONNECT BUS FOR MULTIPROCESSOR ARCHITECTURE

TECHNICAL FIELD

This disclosure relates generally to multiprocessor architecture, and in particular, relates to multiprocessor architecture implemented with at least one optical bus.

BACKGROUND INFORMATION

Multiprocessor architectures enable processing systems to scale with demand simply by adding additional processors. As such, multiprocessor architectures are popular solutions for growing businesses that require scalable solutions to absorb increased transaction volume. Multiprocessor architectures may be implemented to realize network processors, web servers, database servers, and the like.

FIG. 1A illustrates a known symmetric multi-processing ("SMP") architecture 100A. SMP architecture 100A includes multiple processors that are coupled in parallel via an electrical interconnect to a single pool of shared memory. Known SMP architectures range from two processors sharing memory to as many as thirty-two or more. Generally, one processor is designated as the boot processor that loads an operating system ("OS") from an attached storage device into the shared memory. Once the OS is loaded, the other processors are brought online. Typically, SMP architecture 100A maintains a single OS instance and a single instance of each application in shared memory. The processors are used as a pool of processing resources, all of which may be processing at a given time or waiting in an idle loop to be assigned a task. SMP architecture 100A is faster than a unitary processing system because each processor can be assigned to execute a different application in parallel, or if the applications are multithreaded, multiple processors can be assigned to execute each thread of a multithreaded application.

SMP architecture 100A is scalable by simply plugging in additional processors. As the number of processors increase so to does the number of applications or threads that may be simultaneously executed in parallel.

FIG. 1B illustrates a known massively parallel processing ("MPP") architecture 100B. MPP architecture 100B is different from SMP 100A in that each processor is coupled to its own local memory and maintains its own instance of an OS and applications it is executing. MPP architecture 100B uses a different multiprocessing paradigm than SMP architecture 100A. MPP architecture 100B divides a large task into subtasks that can be solved simultaneously. The results of the subtasks are then shared over a high-speed electrical interconnect. In order to leverage the parallel processing power of MPP architecture 100B, a large problem must be susceptible to a divide and conquer approach.

Other solutions include coupling multiple processors in a point-to-point configuration where each processor is directly coupled to each of the other processors. While these configurations are able to provide the desired interconnect bandwidth, the configurations are complex, requiring multiple electrical interconnect buses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for implementing a multiprocessor architecture implemented with at least one optical bus are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
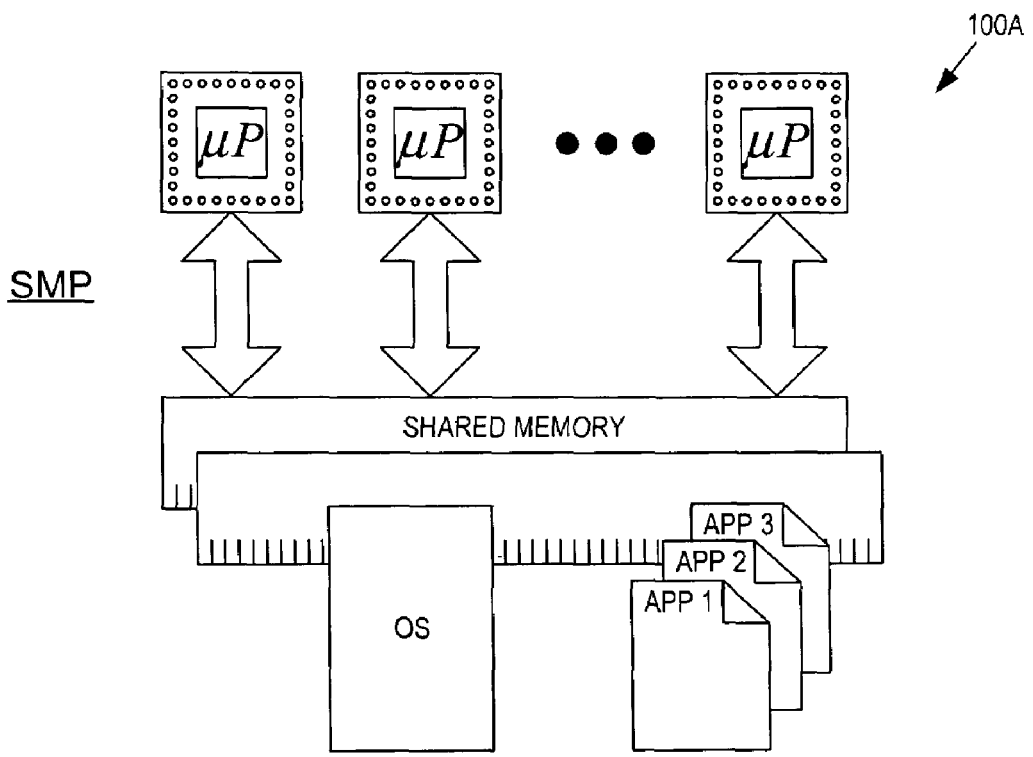
FIG. 1A is an illustration of a known symmetric multi-processing ("SMP") multiprocessor architecture.
Figure 1B:
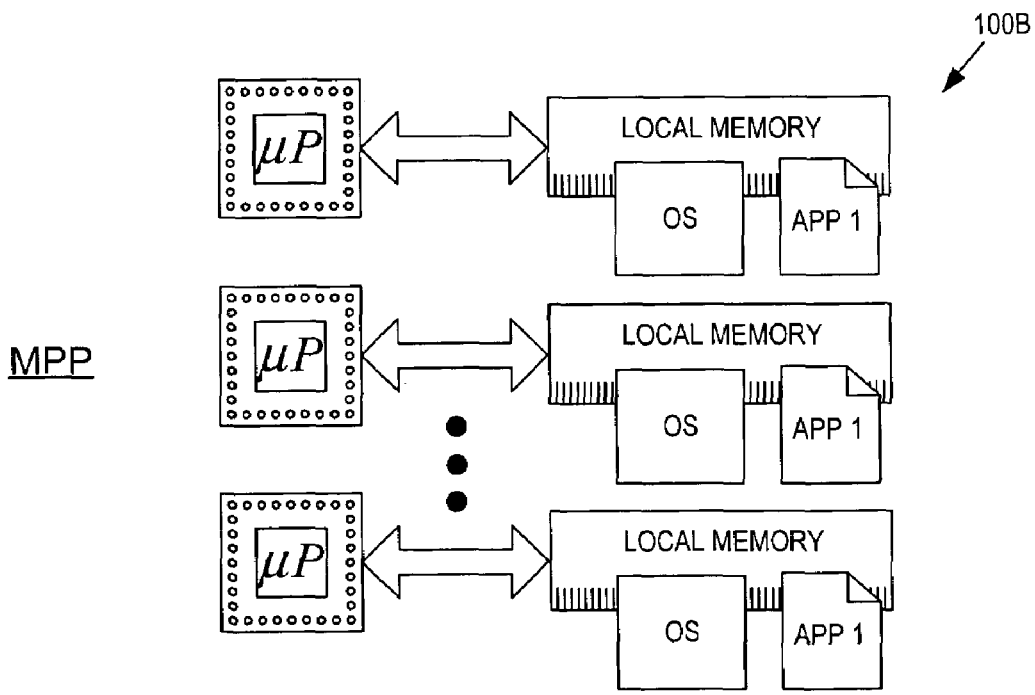
FIG. 1B is an illustration of a known massively parallel processing ("MMP") multiprocessor architecture.
Figure 2:
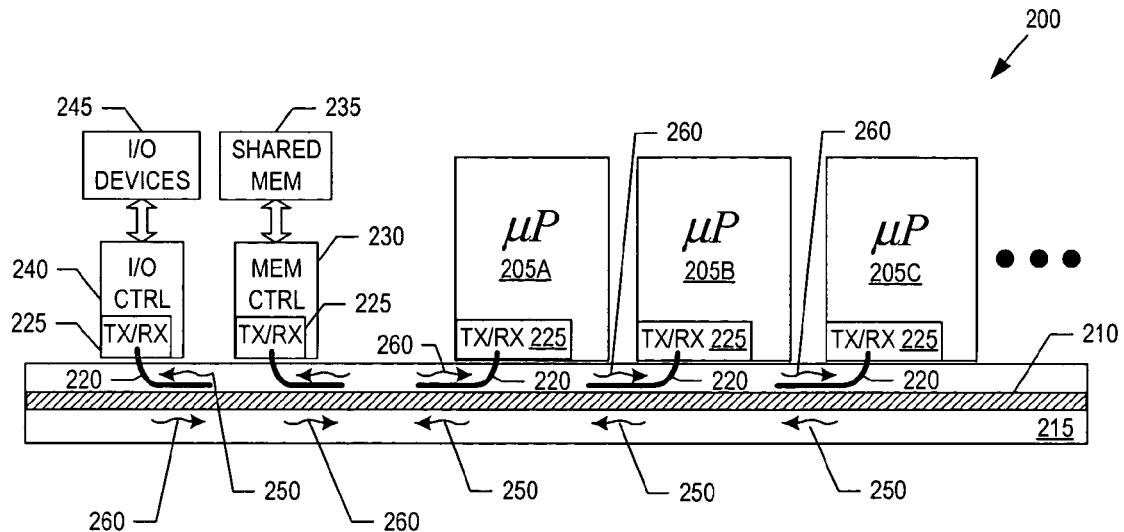
FIG. 2 is an illustration of a multiprocessor architecture implemented with a single optical bus, in accordance with an embodiment of the present invention.

FIG. 2 illustrates a multiprocessor system 200 implemented with a single optical bus, in accordance with an embodiment of the present invention. The illustrated embodiment of multiprocessor system 200 includes multiple processors 205A, 205B, and 205C (collectively 205), an optical bus 210, a circuit board 215, optical couplers 220, transceivers 225, a memory controller 230, shared memory 235, an input/output ("I/O") controller 240, and I/O devices 245.

The components of multiprocessor system 200 are interconnected as follows. Processors 205 are mounted on circuit board 215 and optically interconnected to optical bus 210 via optical couplers 220 and transceivers 225. Embodiments of processors 205 may include general-purpose processors, central processing units ("CPUs"), microprocessors, application specific processors, and the like. Processors 205 generate electrical data that is converted into optical signals 250 by transceivers 225 and launched onto optical bus 210.

In one embodiment, optical signals 250 launched from processors 205 are all launched onto optical bus 250 propagating towards memory controller 230 and I/O controller 240. In the illustrated embodiment of multiprocessor system 200, processors 205 communicate with each other through shared memory 235. Thus, if processor 205C desired to pass data to processor 205A, the data would first be communicated to shared memory 235 via optical bus 210 and memory controller 230 as one of optical signals 250. Subsequently, the data would be launched back onto optical bus 210 by memory controller 230 addressed for processor 205A as one of optical signals 260. Thus, each of processors 205 may communicate directly with either shared memory 235 or I/O devices 245, but communicate with each other via shared memory 235.

Write access onto optical bus 210 may be scheduled using any number of multiple access protocols that may be specially selected or tailored depending upon usage demands of I/O controller 240, memory controller 230, and processors 205. For example, some multiple access protocols that may be applied include pure ALOHA, slotted ALOHA, persistent carrier sense multiple access ("CSMA"), nonpersistent CSMA, p-persistent CSMA, CSMA with collision detection ("CSMA/CD"), collision-free protocols, limited-contention protocols, wavelength division multiple access protocols ("WDMA"), and the like. Further, the multiple access protocols may further include weighted write access biased towards devices with increased write traffic (e.g., memory controller 230). In a WDMA embodiment, each optical bus client device (e.g., processors 205, memory controller 230, and I/O controller 240) may write to optical bus 210 at a different wavelength, while each device is capable of reading from optical bus 210 at all the communication wavelengths, thereby avoiding write contentions.

Optical bus 210 provides an add/drop optical interconnect between processors 205, memory controller 230, and I/O controller 240. Utilization of an optical add/drop interconnect provides a high bandwidth and low latency bus to interconnect these devices. Optical bus 210 may include any medium capable of transporting optical signals therein. In one embodiment, optical bus 210 is a waveguide (e.g., planar waveguide, optical fiber, rib waveguide, etc.) laminated into circuit board 215. In this laminated embodiment, the waveguide may be formed of known polymer materials. In one embodiment, optical bus 210 is mounted to a surface of circuit board 215 or even simply a flexible cable waveguide (e.g., optical fiber) interconnecting transceivers 225 and strewn over the surface of circuit board 210. In the cable waveguide embodiment, small form factor connectors, such as a MT-RJ connector, may couple the waveguide to each optical coupler 220. In yet other embodiments, optical bus 210 may simply be free space and transceivers 225 oriented to have line-of-sight view with each other.

Optical bus 210 may undertake any number of tasks within a multiprocessor architecture. In one embodiment, optical bus 210 may function as a memory access bus (a.k.a. front side bus) for accessing shared memory 235 through memory controller 230. In one embodiment, optical bus 210 may function as an 1/0 bus for accessing I/O devices 245. I/O devices 245 could include various I/O devices currently coupled to the I/O controller hub in an Intel Hub Architecture, including Integrated Drive Electronic ("IDE") hard disks, an Ethernet port, a Universal Serial Bus, Flash ROM, a Peripheral Component Interconnect ("PCI") bus, an audio bus, and the like. I/O controller 240 may further couple to a graphics card and any number of other I/O devices. In one embodiment, I/O controller 240 is a redundant array of independent disks ("RAID") controller and I/O devices 245 are RAID drives. It should further be appreciated that multiple I/O controllers 240 could be coupled to optical bus 210.

In yet other embodiments, optical bus 210 may function as a coherency bus to synchronize the operation of processors 205 and/or provide cache-coherent access to shared memory 235. As illustrated in FIG. 2, optical bus 210 may function as a general-purpose system bus (e.g., front side bus) performing all or some of the above functions. In fact, optical bus 210 may also be adapted to a single processor architecture having a high-speed optical system bus.

In one embodiment, optical couplers 220 are evanescent couplers. The evanescent couplers can be configured to absorb an appropriate ratio of optical energy propagating within optical bus 210 based on a number of physical interaction factors. Such physical interaction factors include separation distance between the evanescent coupler and optical bus 210, interaction length (i.e., the longitudinal length of the evanescent coupler running along side optical bus 220 at the separation distance), and a ratio between the index of refraction of optical couplers 220 to optical bus 210. In one embodiment, these physical factors are appropriately set to ensure each optical coupler 220 absorbs an approximately equal portion of optical energy propagating within optical bus 210. For example, in FIG. 2 (assuming additional processor 205 are not present) each optical coupler 220 of processors 205 may be configured to split off one third of optical signals 260 propagating to the right while optical couplers 220 of I/O controller 240 and memory controller 230 may be configured to split off one half of optical signals 250 propagating to the left.

Although the optical couplers 220 illustrated in FIG. 2 are unidirectional in terms of signal propagation (i.e., launch optical signals 250 onto optical bus propagating in a single direction and receive optical signals 260 propagating on optical bus 210 from a single direction), optical couplers 220 are bi-directional in terms of read/write communications. In other embodiments, optical couplers 220 may be unidirectional in terms of read/write access to optical bus 210 by appropriate adjustment of the index of refraction of optical couplers 220 in comparison to the index of refraction of optical bus 210.

Although optical couplers 220 are illustrated as evanescent couplers, various other types of known couplers may be implemented in connection with embodiments of the present invention. For example, standard directional couplers, beam splitters, and free-space configurations may be used.

Processors 205 and transceivers 225 may be packaged and/or integrated using a number of different techniques. In one embodiment, each processor 205 is independently package along with its corresponding transceiver 225 on a one-to-one basis into individual chip module packages, such as a flip-chip or the like with integrated optical ports. In this one-to-one embodiment, the processor may be integrated onto one die while the optical components of transceiver 225 are integrated separately. Alternatively, a hybrid integration may include the processor and optical components all integrated onto a single die (for example multicore processors). Other embodiments may include multiple processors integrated onto a single die (for example multicore processors) with the optical components of transceivers 225 integrated onto a separate die, but all integrated within a single chip module package. In yet other embodiments, the optical components of transceiver 225 may be external to the chip module packages housing processors 225. In one embodiment, one or more of processors 205 may be capable of hyper-threading by using additional registers to overlap two or more instructions streams. It should be appreciated that a large combination of packaging variations may be implemented in connection with embodiments of the present invention. Various integration techniques are discussed in further detail below in connection with FIGS. 7 and 9.

Figure 3:
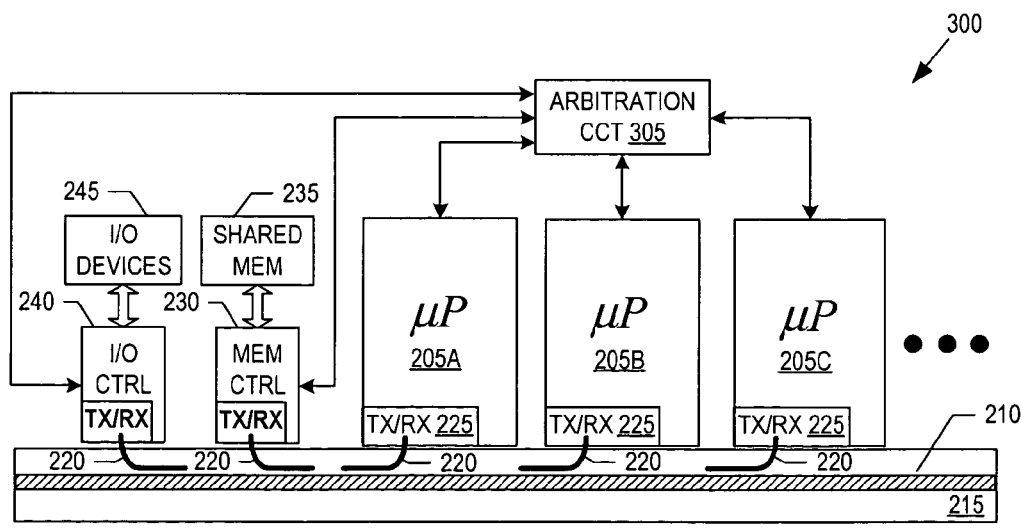
FIG. 3 is an illustration of an arbitration circuit to arbitrate write access between multiple processors to an optical bus, in accordance with an embodiment of the present invention.

FIG. 3 illustrates a multiprocessor system 300 including an arbitration circuit 305 for arbitrating write access to optical bus 210, in accordance with an embodiment of the present invention. Multiprocessor system 300 is similar to multiprocessor system 200 with the exception of the addition of arbitration circuit 305.

In one embodiment, arbitration circuit 305 provides an out-of-band slow-speed path for arbitrating write access to the high-speed optical bus 210. Since the bandwidth necessary to arbitrate for write access to optical bus 210 may be considerably less than the bandwidth provided by optical bus 210, arbitration circuit 305 need not be an optical path like optical bus 210, though it certainly could be. In some embodiments, arbitration circuit 305 is an electrical interconnect between processors 205, memory controller 230, and I/O controller 240 including logic capable of arbitrating write access. In one embodiment, arbitration circuit 305 is simply an out-of-band electrical path coupling various client devices having write privileges to optical bus 210, with one of processors 205 functioning to arbitrate and allocate write access.

It should be appreciated that various other arbitration techniques may be implemented with embodiments of the present invention. For example, a separate wave length may be allocated on optical bus 210 itself for command and control functionality, such as write access arbitration.

Figure 4:
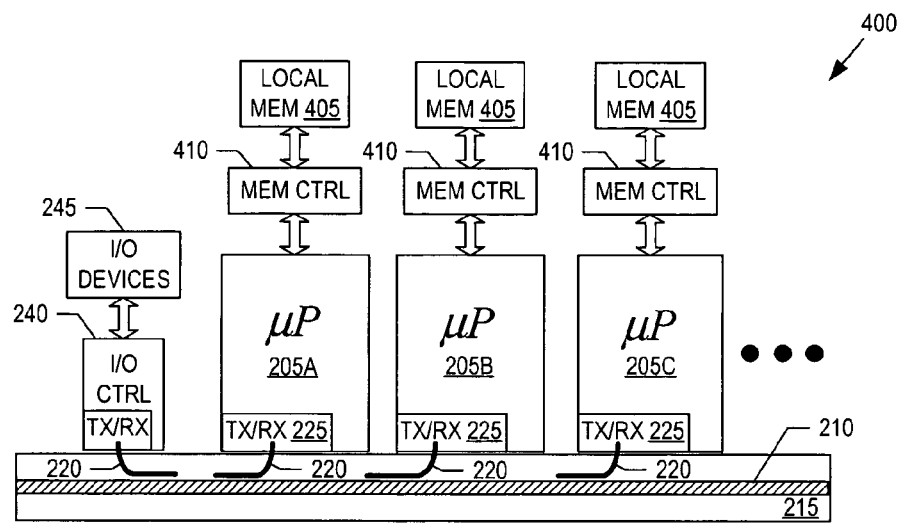
FIG. 4 is an illustration of a multiprocessor architecture including distributed local memory for each of the multiple processors, in accordance with an embodiment of the present invention.

FIG. 4 illustrates a multiprocessor system 400 including distributed local memory for each processor 205, in accordance with an embodiment of the present invention. Again, multiprocessor system 400 is similar to multiprocessor system 200, with the exception that shared memory 235 has been replaced with distributed local memories 405 coupled to processors 205 via individual memory controllers 410. Although not illustrated, multiprocessor system 400 may further include shared memory 235 and memory controller 230 coupled to optical bus 210 to provide shared memory for all processors 205, as well as, local memories 405 to each of processors 205.

The architecture illustrated in FIG. 4 may be implemented to provide Non-Uniform Memory Access ("NUMA") or a modified version thereof. NUMA separates memory into near banks (e.g., local memories 405) and distant banks (e.g., shared memory 235). Since local memories 405 are coupled directly to a single processor, local memories 405 may be accessed quicker than shared memory 235 and without consuming bandwidth on optical bus 210; hence the "non-uniform" nomenclature. Multiprocessor system 400 may further support a cache coherent NUMA ("NUMA-CC") architecture. NUMA-CC enables coherent caching between processors 205. In a NUMA-CC embodiment, optical bus 210 may function as a coherency bus.

Figure 5:
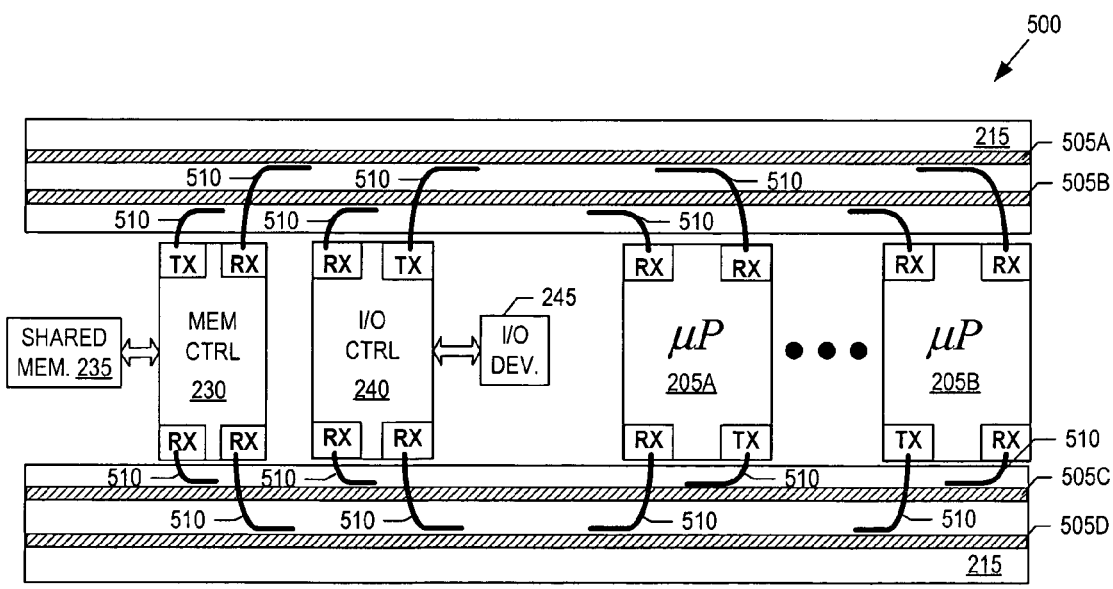
FIG. 5 is an illustration of a multiprocessor architecture using multiple optical buses to provide communication between multiple processors, in accordance with an embodiment of the present invention.

FIG. 5 illustrates a multiprocessor system 500 implemented with multiple optical buses 505A, 505B, 505C, and 505D (collectively 505), in accordance with an embodiment of the present invention. The illustrated embodiment of multiprocessor system 500 includes each client device of optical buses 505 (e.g., processors 205, memory controller 230, and I/O controller 240) with one transmitter to write to a designated one of optical buses 505 and multiple receivers to read from the other optical buses 505. For example, memory controller 230 is the sole client device capable of writing to optical bus 505B, while I/O controller 240 is the sole client device capable of writing to optical bus 505A, and so on for processors 205. In the illustrated embodiment, optical couplers 510 function as unidirectional communication couplers. In other word, optical coupler 510 either read data from optical buses 505 or write data to optical buses 505, but not both.

Assigning only one client device write privileges per optical bus 505 eliminates bus collisions due to two client devices attempting to write to the same optical bus 505 as the same time. Eliminating bus contention/collisions and the overhead associated with bus arbitration simplifies arbitration logic and can maximize individual bus utilization and throughput.

In an embodiment where each client device has sole write privileges to a given optical bus, there is a one to one ratio between client devices and optical buses. Furthermore, if each client device of the optical bus is to have direct read access with all other client devices, then each client device will include N-1 receivers, where N equals the number of client devices accessing optical bus 505. However, using multiple optical buses 505 or a single optical bus 210 need not be an all or one proposition. Combinations of optical bus 210 and optical buses 505 may be implemented together. Further, not all client devices need have read privileges to all optical buses 505. For example, in one embodiment, processor 205B may communicate with processor 205A through shared memory 235. In this embodiment, processor 205B would not need a receiver and corresponding optical coupler 510 coupled to optical bus 505C since data from processor 205A would be received on optical bus 505B from memory controller 230. Similarly, processor 205A would not need a receiver and corresponding optical coupler 510 coupled to optical bus 505D. Reducing the number of tap points on each optical bus 505 can favorably impact the power split ratio of other receivers and optical coupler 510 coupled to a particular optical bus 505.

For the sake of clarity, optical buses 505A and 505B have been illustrated as mounted in or on a separate circuit board than optical buses 505C and 505D. However, embodiments of the present invention include all optical buses 505 mounted in or on a single circuit board 215. Furthermore, although FIG. 5 illustrates the receivers and transmitters of each processor 205 as distinct entities, the receivers and transmitters can be viewed as a single transceiver and even implemented within a single transceiver apparatus or integrated in proximity to each other with their associated processors 205.

Figure 6:
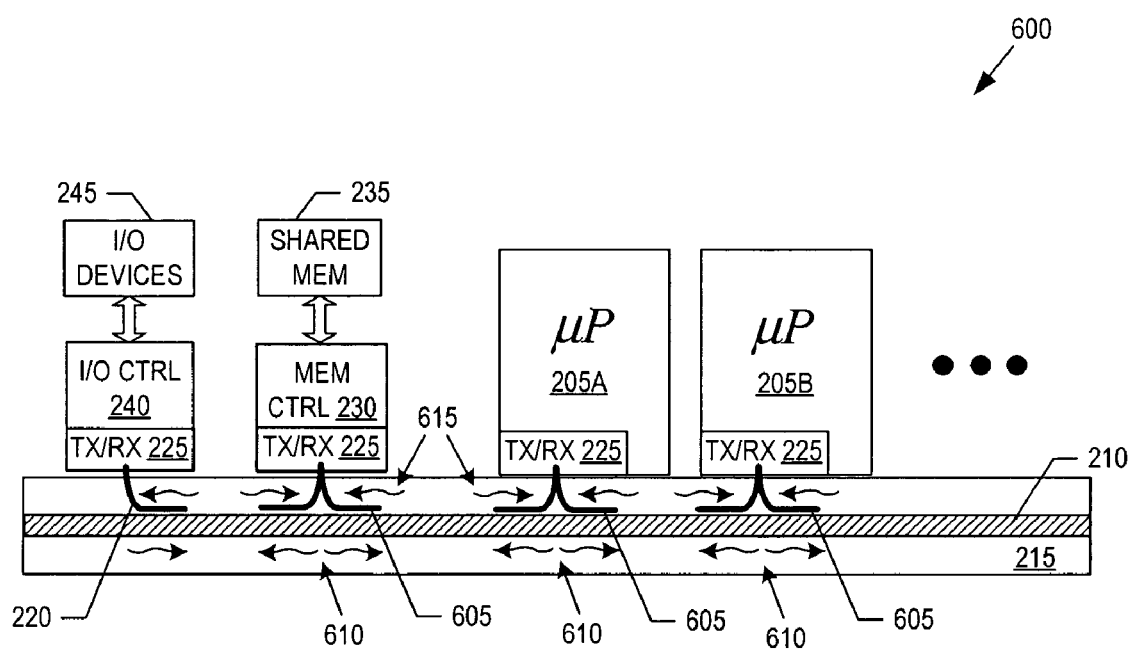
FIG. 6 is an illustration of a multiprocessor architecture enabling bi-directional optical signal propagation onto an optical bus to enable direct communication between the multiple processors, in accordance with an embodiment of the present invention.

FIG. 6 illustrates a multiprocessor system 600 providing bidirectional optical signal propagation on optical bus 210, in accordance with an embodiment of the present invention. Multiprocessor system 600 is similar to multiprocessor system 200 described above, with the exception that bi-directional optical couplers 605 replace optical couplers 220.

In one embodiment, bi-directional optical couplers 605 enable transceivers 225 to launch optical signals 610 onto optical bus 210 propagating in opposing directions. In one embodiment, bi-directional optical couplers 605 further enable transceivers 225 to receive optical signals 615 propagating along optical bus 210 in either direction. Thus, bi-directional optical couplers 605 enable processors 205A and 205B to communicate directly with each other without using shared memory 235 as a proxy.

In one embodiment, end client devices (e.g., I/O controller 240) may simply coupled to optical bus 210 with a unidirectional optical coupler 220, since reception of an optical signal from the left side of I/O controller 240 is not necessary. However, in other embodiments, optical bus 210 may be a ring bus or form a complete circle. In these embodiments, there are no end client devices and therefore all client device may include a bi-directional optical coupler 605. Other embodiments of optical bus 210 may include end mirrors to allow optical signals 610 and 615 to reflect back. In the end mirror embodiments, unidirectional optical couplers 220 may be sufficient to enable direct communication between client devices of optical bus 210.

Bi-directional optical couplers 605 may be formed of an optical Y-splitter and two opposing evanescent couplers. The common end of the optical Y-branch splitter is coupled to a transceiver while the diverging ends are coupled to the opposing evanescent couplers. The Y-branch splitter splits an optical signal output by one of transceivers 225 into two optical signals 610 having approximately equal power. The opposing evanescent couplers then couple optical signals 610 onto optical bus 210 in counter propagating directions.

Figure 7:
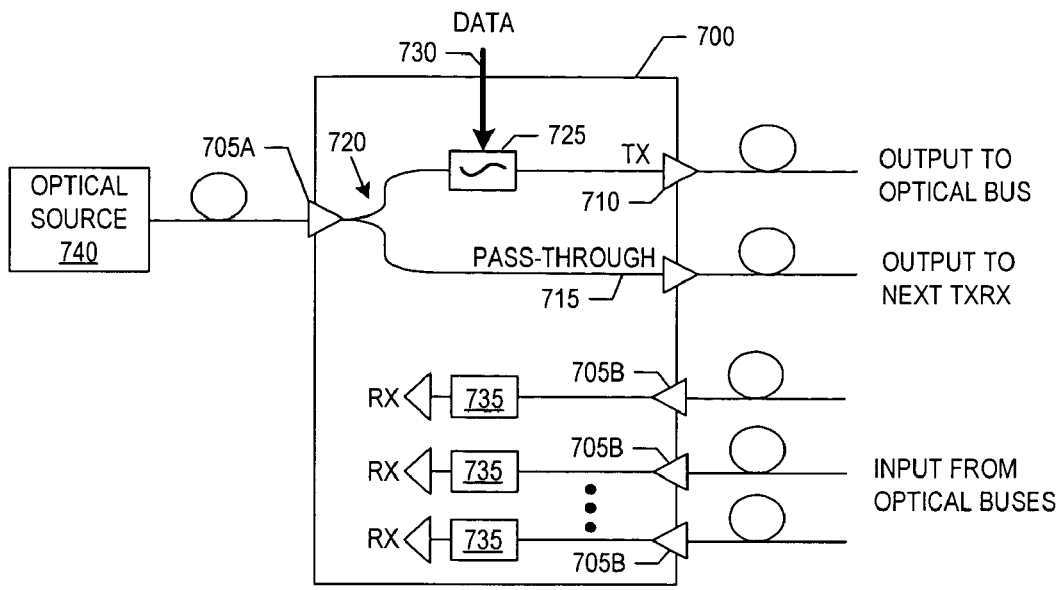
FIG. 7 is an illustration of a transceiver for converting data between the electrical and optical realms in a multiprocessor architecture using an optical bus, in accordance with an embodiment of the present invention.

FIG. 7 illustrates a transceiver 700 for converting data between the electrical and optical realm in a multiprocessor architecture using an optical bus, in accordance with an embodiment of the present invention. Transceiver 700 represents one possible embodiment for implementing transceivers 225 and/or the receivers and transmitters illustrated in FIG. 5. The illustrated embodiment of transceiver 700 includes optical input ports 705A and 705B, an optical output port 710, a pass-through 715, an optical splitter 720, an electrical-to-optical ("E-O") transmitter 725, an electrical input port 730, and optical-to-electrical ("O-E") receivers 735.

Figure 8:
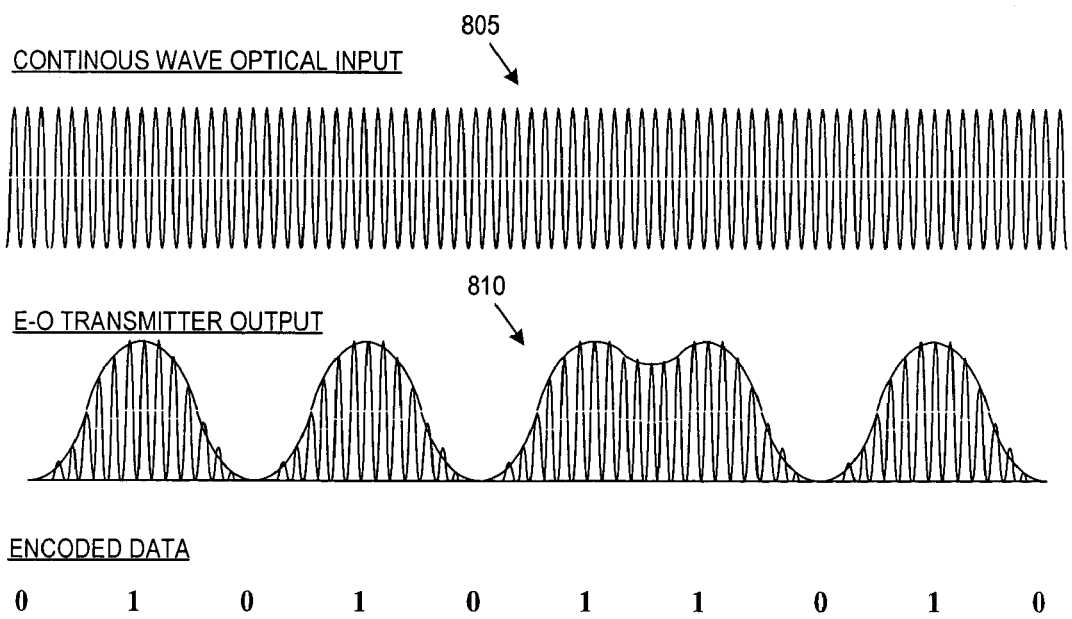
FIG. 8 is an illustration of demonstrative signal waveforms for communicating over an optical bus between multiple processors, in accordance with an embodiment of the present invention.

In one embodiment, optical input port 705A receives a continuous wave ("CW") optical input (e.g., waveform 805 illustrated in FIG. 8) from an optical source 740. In one embodiment, optical source 740 may be external to transceiver 700 and mounted on circuit board 215. Alternatively, optical source 740 could be mounted within the chip module package housing one or more of processors 205 or at another convenient location. In the externally mounted embodiment, the CW optical input may be provided to transceiver 700 via a waveguide or optical fiber coupled to optical input port 705A. In an alternative embodiment, optical source 740 may be integrated into transceiver 700. Integration of optical source 740 may be accomplished using various types of semiconductor laser sources, such as, a Vertical-Cavity Surface-Emitting Laser ("VCSEL") and the like.

The CW optical input received at optical input port 705A is split into approximately equal portions by optical splitter 720. In one embodiment, optical splitter 720 is a 50/50 Y-branch splitter. A first portion of the CW optical input is provided to E-O transmitter 725 as a carrier wave on which electrical data, received from one of processors 205 via electrical input port 730, is modulated (e.g., waveform 810 illustrated in FIG. 8). In one embodiment, E-O transmitter 725 is formed of an electro-absorption modulator ("EAM"), such as an appropriately biased diode or the like. It should further be appreciated that in an embodiment where optical source 740 is integrated into transceiver 700, optical source 740 could be directly modulated without need for E-O transmitter 725.

Subsequently, the optical signal having data encoded thereon (i.e., modulated CW optical input) is output through optical output port 710. Optical output port 710 is coupled to one of optical buses 210 or 505 via optical couplers 220 or 510, respectively.

In one embodiment, a second portion of the CW optical input is passed through transceiver 700 via pass-through 715 to a next or adjacent transceiver. Thus, in one embodiment, transceivers 225 are optically daisy-chained via pass-through 715 to a single optical source 740 that feeds all transceivers 225 with the CW optical input to provide an optical carrier wave. It should be appreciated that the split proportionality of optical splitter 720 may be varied to provide substantially equal optical energy to each E-O transmitter 725 depending upon the number of transceivers 700 daisy-chained together.

Optical input ports 705A are coupled to optical buses 210 or 505 via optical couplers 220 or 510, respectively. Optical signals received from the optical buses are guided to O-E receivers 735, converted or demodulated into electrical signals and provided to one of processors 205, memory controller 230, or PO controller 240. If transceiver 700 is implemented in connection with optical bus 210, only a single O-E receiver 735 may be used; however, if optical bus 210 supports a WDMA protocols, then multiple O-E receivers 735 may be coupled to optical bus 210 for each wavelength. If transceiver 700 is implemented in connection with optical buses 505, then each O-E receiver 735 may be coupled to a corresponding one of optical buses 505.

Figure 9:
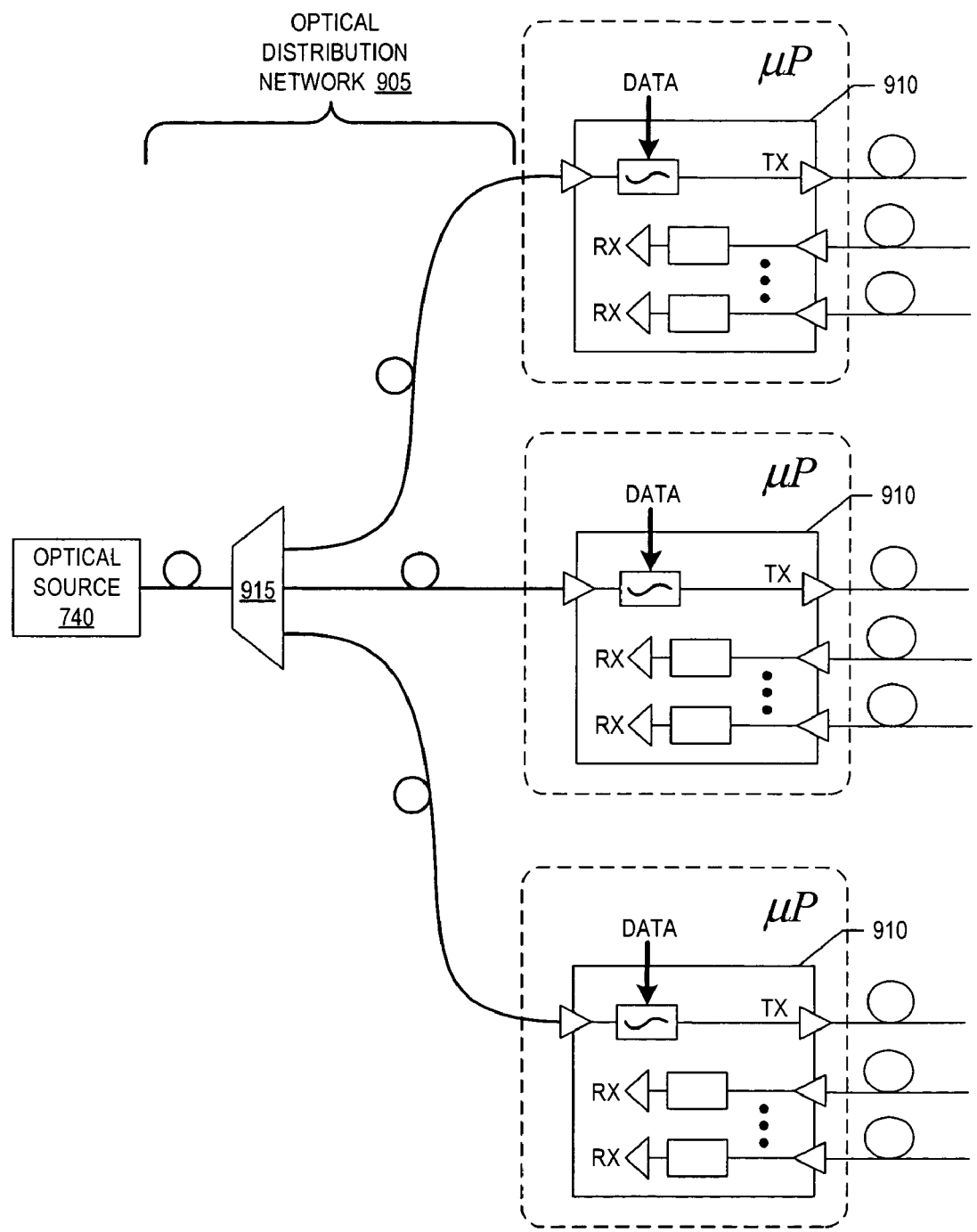
FIG. 9 is an illustration of an optical distribution network for distributing an optical input to multiple transceivers of a multiprocessor architecture implemented with an optical bus, in accordance with an embodiment of the present invention.

FIG. 9 illustrates an optical distribution network ("ODN") 905 for distributing the CW optical input to multiple transceivers 910, in accordance with an embodiment of the present invention. ODN 905 splits the CW optical input into substantially equal portions prior to transceivers 910 using an optical splitter 915. Optical splitter 915 may be implemented using any number of known one to many optical splitters, including but not limited to, a multi-fanout "H-Tree" splitter using Y-Branch splitters coupled end-to-end, a multi-mode interference device, and the like.

ODN 905 may have advantages in certain scalable embodiments over the daisy chain transceiver 700. ODN 905 can be easily scaled to accept additional processors and provide substantially equal portions of the CW optical input generated from optical source 740 by interchanging or adjusting optical splitter 915. Furthermore, transceivers 810 do not require an internal optical splitter or pass-through 715.

It should be appreciated that the embodiments disclosed above may be embodied within a physical apparatus or system, as well as, embodied within a machine-readable medium (e.g., hard disk, CD-ROM, or other portable media) having stored thereon one or more descriptions of the above embodiments, or portions thereof. These descriptions may include behavioral level code describing the operations of the above embodiments using hardware descriptive languages, such as VHDL or Verilog. Alternatively, the descriptions may include register transfer level ("RTL") code, a netlist, or even a circuit layout of processors 205 along with transceivers 225, or portions thereof. The behavioral level code, the RTL code, the netlist, and the circuit layout all represent various levels of abstraction that may be used to describe the above embodiments of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   an optical bus to interconnect processors of a multiprocessor system;
   at least one electrical-to-optical ("E-O") transmitter coupled to receive electrical signals from one of the processors and to convert the electrical signals to first optical signals to be guided onto the optical bus;
   optical-to-electrical ("O-E") receivers coupled to receive second optical signals from the optical bus and to convert the second optical signals to electrical signals for the processors; and
   first optical couplers coupling the at least one E-O transmitter and the O-E receivers to the optical bus, wherein the at least one E-O transmitter comprises:
      an input port to receive a continuous wave ("CW") optical input;
      an optical splitter to split the CW optical input into a first portion and a second portion;
      a modulator to modulate the electrical signals onto the first portion of the CW optical input; and
      an output port to output the second portion of the CW optical input to a next E-O transmitter of a next processor.

2. The apparatus of claim 1, further comprising a circuit board to receive the processors thereon.

3. The apparatus of claim 2, wherein the optical bus comprises one of an optical fiber and a planar waveguide.

4. The apparatus of claim 2, further comprising:
   a memory controller mounted to the circuit board to electrically couple to shared memory; and
   a second optical coupler to optically couple the memory controller to the optical bus, the memory controller to provide the processors access to the shared memory through the optical bus.

5. The apparatus of claim 2, further comprising:
   an input/output ("I/O") controller mounted to the circuit board to electrically couple to electrical I/O devices; and
   a second optical coupler to optically couple the I/O controller to the optical bus, the I/O controller to provide the processors access to the electrical I/O devices through the optical bus.

6. The apparatus of claim 2, further comprising the processors and wherein at least one E-O transmitter, at least one O-E receiver, and at least one processor are integrated into a single chip package mounted on the circuit board.

7. The apparatus of claim 2, further comprising the processors and wherein at least one E-O transmitter, at least one O-E receiver, and at least one processor are integrated into a single semiconductor die.

8. The apparatus of claim 1, wherein the first optical couplers comprise evanescent optical couplers.

9. The apparatus of claim 8, wherein the evanescent optical couplers comprise bi-directional optical couplers to propagate the first optical signals in multiple directions on the optical bus and to receive the second optical signal from multiple directions on the optical bus.

10. The apparatus of claim 1, further comprising multiple E-O transmitters to receive the electrical signals from the processors and optically coupled to the optical bus to convert the electrical signals to the first optical signals to be guided onto the optical bus.

11. The apparatus of claim 10, further comprising an arbitration circuit to arbitrate write access to the optical bus between the processors.

12. The apparatus of claim 1, further comprising:
   multiple optical buses to interconnect the processors; and
   multiple E-O transmitters, each of the multiple optical buses optically coupled to one of the multiple E-O transmitters, each of the multiple E-O transmitters to electrically couple to one of the processors,
   wherein each of the multiple optical buses is optically coupled to multiple of the O-E receivers and wherein each processor is to electrically couple to multiple of the O-E receivers.

13. The apparatus of claim 1, further comprising:
   an optical source to generate a continuous wave ("CW") optical signal; and
   an optical distribution network to distribute portions of the CW optical signal to multiple E-O transmitters.

* * * * *

UNITED STATES PATENT AND TRADEMARK OFFICE
CERTIFICATE OF CORRECTION

| | | |
|---|---|---|
| PATENT NO. | : 7,366,368 B2 | Page 1 of 1 |
| APPLICATION NO. | : 10/868571 | |
| DATED | : April 29, 2008 | |
| INVENTOR(S) | : Morrow et al. | |

It is certified that error appears in the above-identified patent and that said Letters Patent is hereby corrected as shown below:

In column 4, at line 3, delete "1/0" and insert --I/O--.
In column 7, at line 24, delete "Y-Splitter" and insert --Y-branch splitter--.
In column 8, at line 27, delete "PO" and insert --I/O--.

Signed and Sealed this

Thirty-first Day of March, 2009

JOHN DOLL
*Acting Director of the United States Patent and Trademark Office*